(12) United States Patent
Nachreiner et al.

(10) Patent No.: US 8,782,117 B2
(45) Date of Patent: Jul. 15, 2014

(54) CALLING FUNCTIONS WITHIN A DETERMINISTIC CALLING CONVENTION

(75) Inventors: Philip J Nachreiner, Redmond, WA (US); Peter M Wiest, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 126 days.

(21) Appl. No.: 13/561,423

(22) Filed: Jul. 30, 2012

(65) Prior Publication Data

US 2013/0054669 A1 Feb. 28, 2013

Related U.S. Application Data

(60) Provisional application No. 61/527,111, filed on Aug. 24, 2011.

(51) Int. Cl.
G06F 15/16 (2006.01)
G06F 17/30 (2006.01)

(52) U.S. Cl.
USPC ........... 709/201; 709/217; 709/205; 709/200; 709/204; 719/328; 719/310; 719/330; 719/312

(58) Field of Classification Search
CPC ................................. G06F 17/30; G06F 15/16
USPC ........................ 709/205, 204, 201, 217, 200
See application file for complete search history.

(56) References Cited

U.S. PATENT DOCUMENTS

| | | | |
|---|---|---|---|
| 6,629,154 B1 | 9/2003 | Jones et al. | |
| 7,010,796 B1 * | 3/2006 | Strom et al. | 719/328 |
| 7,110,894 B2 * | 9/2006 | Auber et al. | 702/55 |
| 7,496,898 B1 | 2/2009 | Vu | |
| 7,865,697 B2 * | 1/2011 | Machulsky et al. | 712/34 |
| 8,402,081 B2 * | 3/2013 | Sandoval et al. | 709/201 |
| 2006/0085423 A1 | 4/2006 | Barsness et al. | |
| 2007/0283327 A1 | 12/2007 | Mathew et al. | |
| 2008/0040709 A1 | 2/2008 | Blancha et al. | |
| 2010/0023515 A1 | 1/2010 | Marx | |
| 2012/0016621 A1 | 1/2012 | Tan et al. | |

OTHER PUBLICATIONS

Leroy, Xavier, "Formal Verification of a Realistic Compiler", in Communications of the ACM, vol. 52, Issue 7, Jul. 2009, pp. 107-115.
Lorentz, Diana, "Oracle® Database SQL Reference", Published on: Dec. 2005, Available at: http://docs.oracle.com/cd/B19306_01/server.102/b14200.pdf.

* cited by examiner

*Primary Examiner* — Jude Jean Gilles
(74) *Attorney, Agent, or Firm* — Bryan Webster; Peter Taylor; Micky Minhas

(57) ABSTRACT

Different target functions at a target computing platform having limited resources are invoked by a single generic function call from a calling computing platform having substantial resources. A target function can be called in a consistent and efficient manner, so that custom code can be avoided at the target computing platform for each target function. The generic function call can have parameters which identify a memory location at which a target function is stored, and one or more parameters to be passed to the target function in a format (e.g., length, endianness, enumerated data type, structured record type, float or integer type) which the target function uses, so that further conversion at the target computing platform is avoided. Parameters can also identify a thread and processor on which the function should run. The target computing platform loads and executes the target function using the registers in a deterministic way.

20 Claims, 10 Drawing Sheets

Fig. 5A 500

| |
|---|
| Parameter1 - Thread identifier, 501 |
| Parameter2 - Target function address, 502 |
| Parameter3 – Processor identifier, 503 |
| Parameter4 – First parameter to pass to target function, 504 |
| Parameter5 – Second parameter to pass to target function, 505 |
| Parameter6 – Dummy data, 506 |
| Parameter7 – Dummy data, 507 |
| Parameter8 – Dummy data, 508 |

Fig. 5B 510

| |
|---|
| Parameter1 - Thread identifier, 501 |
| Parameter2 - Target function address, 502 |
| Parameter3 – Processor identifier, 503 |
| Parameter4 – First parameter to pass to target function, 504 |
| Parameter5 – Second parameter to pass to target function, 505 |

Fig. 5C 520

| |
|---|
| Parameter1 - Thread identifier, 501 |
| Parameter2 – Module name, 521 |
| Parameter3 – Ordinal number of target function in module, 522 |
| Parameter4 – Processor identifier, 503 |
| Parameter5 – First parameter to pass to target function, 504 |
| Parameter6 – Dummy data, 506 |
| Parameter7 – Dummy data, 507 |
| Parameter8 – Dummy data, 508 |

Fig. 5D 530

| |
|---|
| Parameter1 - Thread identifier, 501 |
| Parameter2 – Module name, 521 |
| Parameter3 – Name of target function in module, 531 |
| Parameter4 – Processor identifier, 503 |
| Parameter5 – First parameter to pass to target function, 504 |
| Parameter6 – Second parameter to pass to target function, 505 |
| Parameter7 – Dummy data, 507 |
| Parameter8 – Dummy data, 508 |

CALLING FUNCTIONS WITHIN A DETERMINISTIC CALLING CONVENTION

CROSS-REFERENCE TO RELATED APPLICATIONS

This application claims the benefit of U.S. provisional patent application No. 61/527,111, filed Aug. 24, 2011, and incorporated herein by reference in its entirety.

BACKGROUND

Computing devices communicate using various network architectures such as, for example, peer-to-peer or client-server. In some cases, the computing devices use different platforms. Different platforms can also be used on one computing device. A computing platform is generally defined by hardware and software. Example computing devices include personal computers (PCs), television set top boxes, video game/multimedia consoles, mobile/cellular telephones, and automated home appliances. Various techniques allow computing platforms to communicate with one another, such as to allow one platform to invoke a function on another platform. However, processing and memory resources are often limited at a computing platform.

SUMMARY

Disclosed herein are systems and methods for calling functions within a deterministic calling convention. One computing platform referred to as a calling computing platform runs an application which generates a request to invoke a target function on another computing platform referred to as a target computing platform. The calling computing platform packages the request in a generic function call which is suitable for calling multiple different target functions, and which minimizes the consumption of processor and memory resources at the target computing platform. The generic function call can be a call to a generic function at the target computing platform which in turn invokes the target function.

To provide the generic function call, the calling computing platform can convert one or more parameters which are to be passed to the target function to a desired format. In addition, a parameter which identifies a location (e.g., address) of the target function at the target computing platform, a parameter which identifies a thread on which to run the target function, and a parameter which identifies a processor on which to run the target function can be provided. The generic function call can take advantage of a deterministic, e.g., known and predictable, way in which the target computing platform invokes the generic function. For example, the generic function call can have a specified number of parameters which correspond to a number of registers which the target computing platform sets to invoke the generic function. In one approach, the number of parameters is fixed and independent of the target function, in which case unused parameters, if any, can be filled with dummy data.

At the target computing platform, the parameters of the generic function call, when received, are stored in memory. When the target computing platform invoke the generic function, the parameters are loaded into registers, the registers are read to obtain the address of the target function, and to obtain the one or more formatted parameters which are to be passed, and the target function is invoked with the one or more formatted parameters. A return value which is generated by execution of the target function is stored in one of the same registers for return to the calling computing platform.

In one implementation, a method for use at a calling computing platform involves obtaining, from a request for a first target function, an identifier of the first target function and a first parameter to be passed to the first target function. For instance, the identifier can be a name of the first target function, or an index into a table of target functions. The first parameter is an example of one or more parameters to be passed to the first target function which resides at a target computing platform, different than the calling computing platform. Based on the identifier of the first target function, the method further includes determining one or more parameters which identify a memory location of the target computing platform at which the first target function is stored. For example, the one or more parameters can include a physical address, a module name and ordinal number or a module name and function name. The method also determines a format in which the first parameter is used by the first target function. The first parameter is converted from a format in which the first parameter is provided in the request for the first target function, to the format in which the first parameter is used by the first target function, to provide a converted first parameter. A generic function call comprising the above-mentioned parameters is then prepared and communicated to the target computing platform.

A corresponding method for use at a target computing platform is also provided, along with a calling computer device or platform and a called computing device or platform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5A depicts an example configuration 500 of parameters 501-508 in the generic function call 210 of FIG. 2, consistent with the process of FIG. 4, in which a thread identifier, a target function address, first and second parameters to pass to a target function, a processor identifier and dummy data are provided.

FIG. 5B depicts another example configuration 510 of parameters 501-505 in the generic function call 210 of FIG. 2, consistent with the process of FIG. 4, in which a thread identifier, a target function address, first and second parameters to pass to a target function, and a processor identifier, but no dummy data, are provided.

FIG. 5C depicts another example configuration 520 of parameters 501, 521, 522, 503, 504 and 506-508, in the generic function call 210 of FIG. 2, consistent with the process of FIG. 4, in which a thread identifier, a module name, an ordinal number, a processor identifier, a first parameter to pass to a target function and dummy data, are provided.

FIG. 5D depicts another example configuration 530 of parameters 501, 521, 531, 503-505, 507 and 508 in the generic function call 210 of FIG. 2, consistent with the process of FIG. 4, in which a thread identifier, a module name, a target function name, a processor identifier, a first parameter to pass to a target function and dummy data are provided.

DETAILED DESCRIPTION

Figure 1:
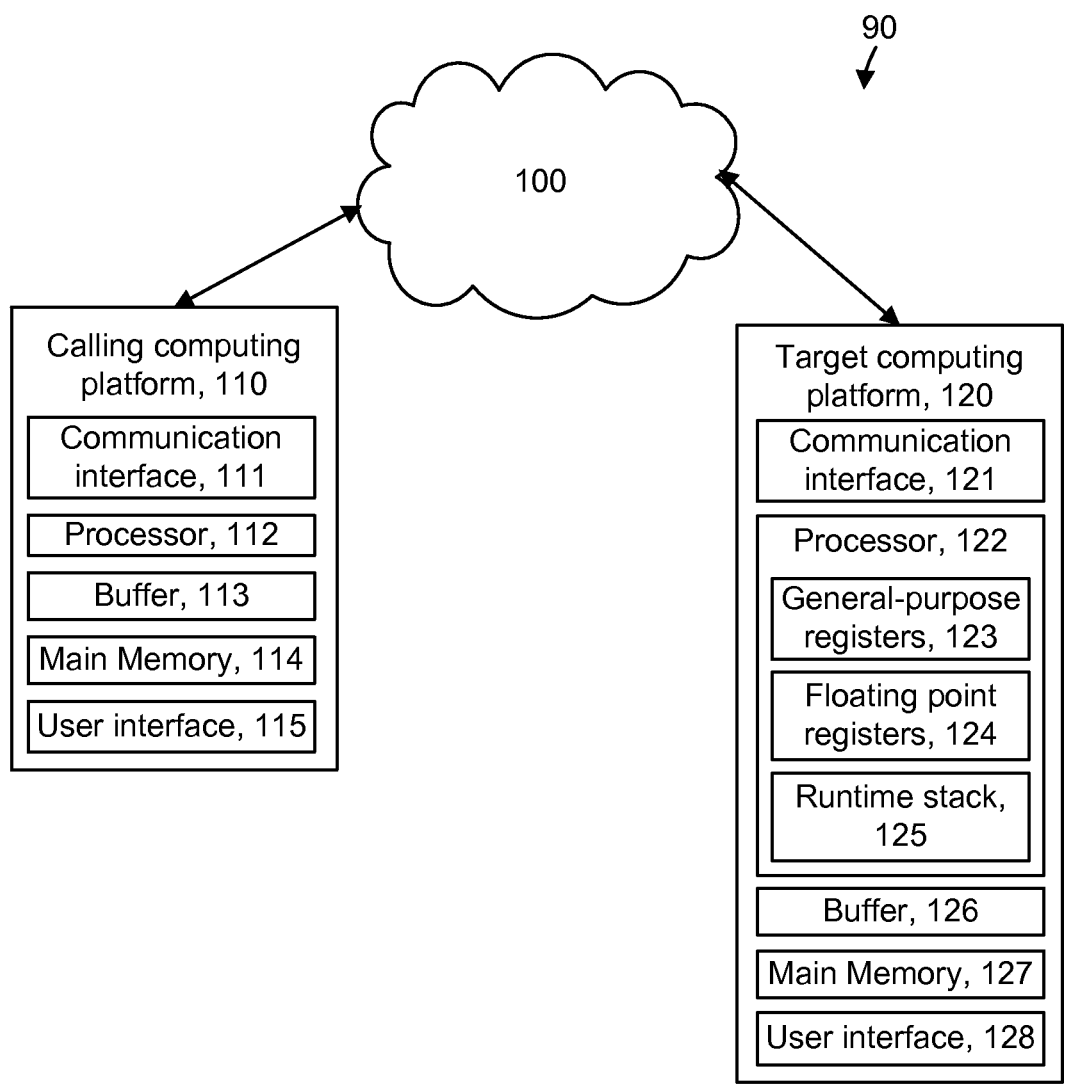
FIG. 1 is a block diagram of a system 90 for calling functions within a deterministic calling convention.

Various techniques are available which allow computing platforms to communicate with one another, such as to allow one platform to invoke a function on another platform. However, a substantial amount of processing and memory resources can be consumed by the computing platforms. Moreover, in some cases, the computing platform which is called (the called or target computing platform) has a relatively small amount of resources compared to another computing platform (the calling computing platform) which initiates the call. As an example, consider a scenario in which a PC, a computing platform with a relatively large amount of resources, calls a game console, a computing platform with a relatively smaller amount of resources.

The substantial resources which are consumed by the target computing platform are caused, typically, by code which is provided for each function to allow the function to be invoked externally. Specifically, this code is used to explicitly define end points and to expose the end points in a callable fashion. This code can involve a wrap function around a target function, with the wrap function implemented in the same language as the target function, where the target function is called through the same language. Another approach uses code to provide a wrap function around the target function and expose the wrap function to an alternate language by which the target function is called. A limitation of these approaches is that they explicitly wrap the target function as opposed to calling the target function directly.

In contrast, techniques provided herein can reduce the load on a target computing platform by providing a generic function call which can be executed with reduced resource consumption. This technology takes advantage of target computing platforms having a deterministic calling convention. A generic function is provided at the target computing platform which can be used to call different target functions in a deterministic way. For example, in a deterministic calling convention, parameters (e.g., arguments) which are passed to functions in respective calls may be stored in the same registers for each call. Similarly, reply values which are received from the target functions based on their execution is stored in those same registers. In one approach, the registers are pre-designated since they are known before a target function is executed. The calling computing platform uses its resources to package the generic function call in a way which is most convenient for the target computing platform, such that the parameters can be stored and loaded into the registers, the target function can be located and executed, and parameters to be passed to the target function can be read from the registers and passed to the target function. The generic function call can provide parameters for specifying how to call a target function, where to call the target function and what to call the target function with, while minimizing processing and storage costs. The format of the generic function call need not change when it used to call another target function, and a new target function can be added to the target computing platform with no change to its code. Instead, one generic function call pattern can be used to call any target function via one generic function at the target computing platform.

The deterministic calling convention is used to provide a generic (no additional code has to be written), scalable (applies to all functions in a system) mechanism of local or remote execution of functions without having to define, expose or wrap the functions explicitly. The technology mimics the calling convention on behalf of the calling computing platform and returns the results of the call to the calling computing platform, as if the calling computing platform had called the target function directly. Essentially, a target function at a target computing platform is called by a calling computing platform in substantially the same way that the target computing platform would have called the target function. Software external to the target computing platform can then be written to execute functions as if they are executed locally.

The target functions can be of any type. In one approach, the target computing platform is part of a computing system on which a respective application runs, and the target function is a system-level function which is associated with the computing system, independent of the application, or an application-level function which is associated with the application. For instance, the target computing platform may be a game console which can run a game application, in which case a target function is associated with either the computing system (e.g., a system function) or with the game application (e.g., an application/title or customer function).

This solution is useful for computing devices such as set top boxes, consoles or mobile phones where exposing callable hooks into the device may not be possible due to resource constraints. Thus, in one approach, custom hooks are not used. This solution can be used to provide software developers with a technique for verifying their applications that applies to all software regardless of technology and implementation. This solution also provides for a generic computing platform (e.g., PC) with a large amount of resources to describe and invoke the functions in a generic scalable manner.

One example implementation involves a test tool that enables developers to inspect the user interface (UI) of their application while it is running. For instance, the test tool may be an application running at a PC which allows a game developer to exercise different functions on a game application running on a game console. Another example implementation allows a user to use a PC or other computer to create accounts, profiles, and so forth on a video game/multimedia console which can communicate via a network with the PC or other computer. For example, a utility can use this technology to enable a third party to programmatically create an account profile from a PC.

In another example implementation, described further below, a managed assembly in the C sharp (C#) programming language was created for test driven development that leverages reflection to automate construction of arguments for invoking functions on a target computing platform.

However, the techniques provided herein are generally applicable in any situation in which it is desired to automate the invoking of functionality on a resource-constrained computing platform. Typically, this can occur when a high resource device invokes a function on a low resource device, where the low resource device could be, e.g., a mobile phone, the chip in an automated home appliance such as a refrigerator or toaster, or a network router, and the high resource device can be, e.g., a PC. However, a function could be invoked by a lower resource device on a higher resource device. For example, a mobile phone could invoke a function on a game console, where the mobile phone is considered to be a low resource device compared to the game console. Other variations are possible.

FIG. 1 is a block diagram of a system 90 for calling functions within a deterministic calling convention. A calling computing platform 110 includes a communication interface 111, a processor 112, a buffer 113, a main memory 114 and a user interface 115. A (called) target computing platform 120 includes a communication interface 121, a processor 122, a buffer 126, a main memory 127 and a user interface 128. The calling computing platform 110 and the target computing platform 120 communicate with each other via one or more networks 100 such as a LAN, WAN, wired connection (e.g., serial COM cable), wireless connection, etc. In one approach, the calling computing platform 110 is a computing device with a relatively large amount of resources such as a PC (e.g., a desktop computer or a laptop computer) and the target computing platform 120 is a computing device with a relatively small amount of resources such as a set top box, video game console/multimedia console, cellular telephone, etc. A target computing platform may be considered to have limited resources because; for example, using too much memory or CPU time will adversely affect performance, or an amount of memory or CPU time which is sufficient to execute a function is not available. Techniques provided herein are advantageous because they reduce the amount of work on the target computing platform, shifting the work to the calling computing platform which is better able to handle it.

The example of FIG. 1 shows one calling computing platform communicating with one target computing platform. However, many variations are possible. For example, multiple calling computing platforms can communicate concurrently with one target computing platform, and one calling computing platform can communicate concurrently with multiple target computing platforms. Moreover, a computing platform can have multiple processors, referred to as processing cores, which can execute respective tasks in parallel.

The communication interfaces allow the platforms to communicate with one another. In one approach, the calling computing platform establishes a connection with the target computing platform when a function at the target computing platform is to be executed. As an example, the communication interfaces can provide a Transmission Control Protocol (TCP) connection. As another example, the communication interfaces can use Hypertext Transfer Protocol (HTTP). Any technology that allows communication between two platforms can be used. The processors 112 and 122 comprise one or more processors and control circuits which provide intelligence for the calling and target computing platforms, respectively. The processor 122 is shown as including general-purposed registers 123, floating point registers 124 and a runtime stack 125, which are discussed further below. The buffers 113 and 126 can be used to temporarily store input and output data at the calling and target computing platforms, respectively. Main memory 114 and 127, such as RAM, is directly accessible to the processors 112 and 122, respectively, and may be used, e.g., to transfer data into the registers from another location such as a buffer. User interfaces 115 and 128 can include an output device such as a display screen and an input device such as a keyboard, mouse, game controller, microphone for voice commands, etc.

As described in greater detail below, the system 90 provides a functionality for calling functions within a deterministic calling convention by creating and issuing a generic function call with an identifier of a target function, converted parameters, dummy parameters, version, core and thread; calling the target function by the generic function; performing the target function; storing results in a known location; and reading the results from the known location and reporting the results.

Figure 2:
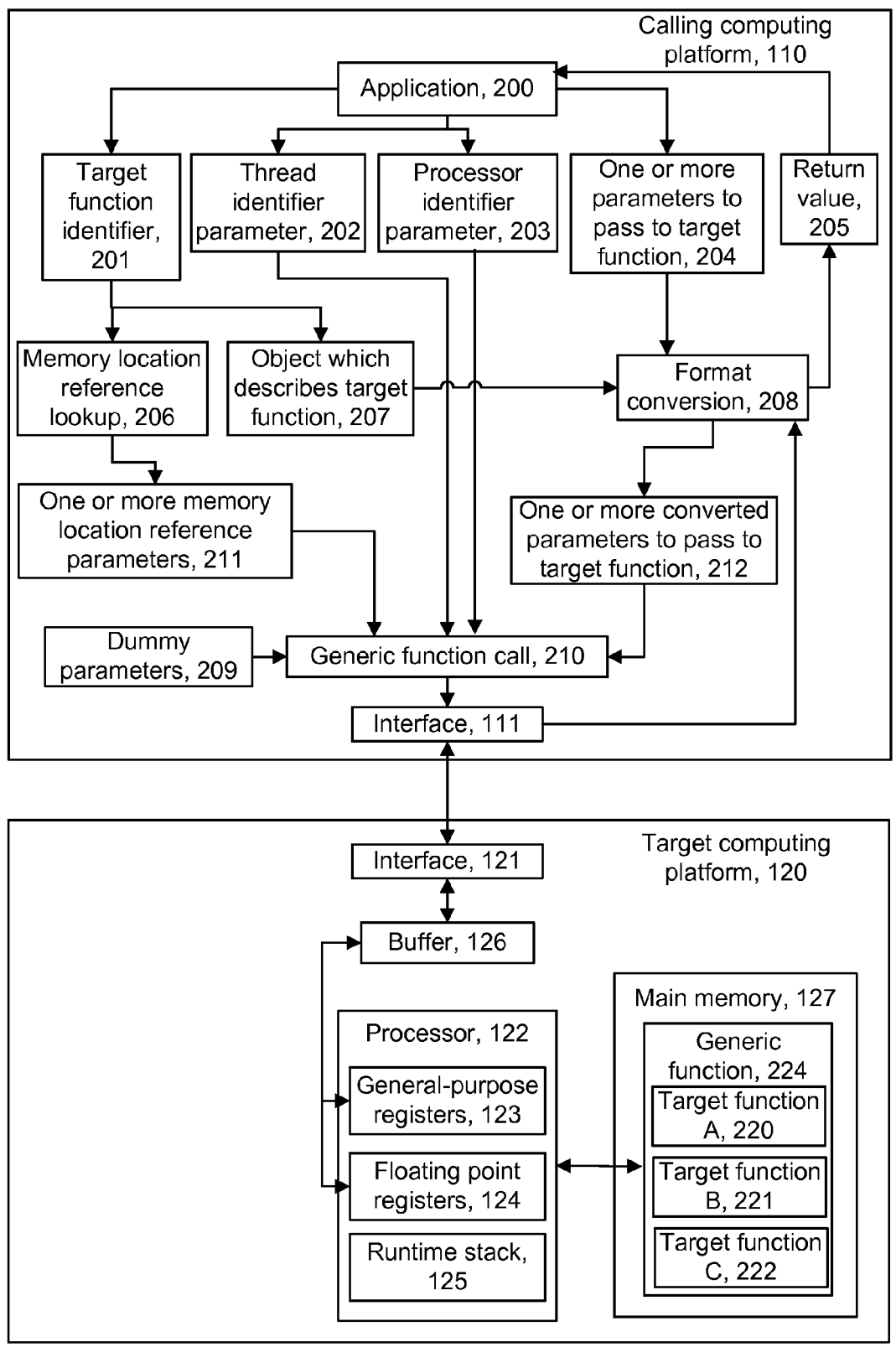
FIG. 2 is an example block diagram of the calling computing platform 110 and the target computing platform 120 of FIG. 1.

FIG. 2 is an example block diagram of the calling computing platform 110 and the target computing platform 120 of FIG. 1. In one approach, the blocks in the calling computing platform 110 represent software processes except for the interface 111 which can represent hardware, while the blocks 125, 220-222 and 224 in the target computing platform 120 represent software processes and the blocks 121-124, 126 and 127 can represent hardware.

An application 200 (e.g., software application) runs on the calling computing platform. The application can invoke functions on the calling computing platform as well as on the target computing platform. In an example, the application invokes a particular function referred to as a called or target function which is stored on the target computing platform. The request from the application can include a number of parameters (e.g., components or arguments) such as a target function identifier 201, a thread identifier 202, a processor identifier 203 and one or more parameters to pass to the target function 204. The target function identifier 201 can be a name of the target function, for instance. The thread identifier 202 can provide an identifier of a thread on which the application wants the target function to run. The thread identifier is provided to create a generic function call 210, e.g., a call to a generic function on the target computing device. The generic function call can be a call having a single format which allows calling of different target functions, one target function per call. The single format can have a fixed number of parameters, where each of the fixed number of parameters has a fixed length. For example, a system thread and application/game thread may run concurrently at the target computing platform, in which case the thread identifier can select one of these thread. The processor at the target computing platform uses the thread identifier to run the target function on the identified thread. The processor identifier 203 can be an identifier of a processor (e.g., a processor core) among multiple available processors at the target computing platform on which the application wants the target function to run. The processor identifier is also provided to create the generic function call 210. The one or more parameters to pass to the target function 204 are arguments/values which are input to the target function. Parameters can be of various types, such as an integer number, a floating point number, an enumerated data type (e.g., including a flag) and a structured record type (e.g. a record that is used to store multiple values).

The target function identifier is provided to a memory location reference lookup 206 and to an object which describes the target function 207. The memory location reference lookup provides a memory location reference (a reference to a location in memory) at the target computing platform for the target function. The memory location reference can be provided as one or more memory location reference parameters 211. These are one or more parameters which identify a memory location. For example, the memory location reference parameters can comprise a physical address at the target computing platform for the target function. This may be used when the physical address is known to the calling computing platform. In another possible approach, the memory location reference parameters comprises a name of a module at the target computing platform in which the target function is located, and an ordinal number (e.g., a sequential position) of the target function within the module. This may be used when the target function has been exported from the target computing platform to the calling computing platform by ordinal number. In another possible approach, the memory location reference parameters comprise the name of the module and the name of the target function within the module. This may be used when the target function has been exported from the target computing platform to the calling computing platform by name. In one approach, a determination is made as to whether the function has been exported to the calling computing platform. If it has been, a check is made to see if the function is on a list of functions. If the function is listed, it can be called by ordinal. If the function is not listed, it can be called by name. Generally, the memory location reference lookup may include a memory location reference for multiple target functions, and the memory location reference parameter which is selected and provided to create the generic function call 210 is the one that corresponds to the particular target function identifier 201 which is designated by the application.

The object which describes the target function 207 can be a data object which provides information about a format of input data to the target function. One or more formats can be associated with each of one or more types of input data. For example, a format can indicate whether an input to the target function should be an integer or a floating point number, a length (e.g., in bits, such as 32 or 64 bits) of the input, an endianness, and a format of an enumerated data type or structured record type. Regarding endianness, this typically refers to how bytes are ordered within a single 16-, 32-, or 64-bit word, in which case the endianness is the byte order. A big-endian platform stores the most significant byte first, and a little-endian platform stores the least significant byte first. A mixed-endian process is also possible in which the ordering of bytes within a 16-bit word differs from the ordering of 16-bit words within a 32-bit word, for instance.

The object which describes the target function 207 represents an unimplemented declaration of the target function. In one approach, the input parameters which are used by a target function, and the format in which the parameters are used, are determined using a reflection mechanism to discover class information of the unimplemented declaration. The calling computing platform may have a library of such unimplemented declarations for multiple target functions. Reflection is a mechanism for discovering class information of an object at run time. An example is the use of reflection in the .NET Framework in which classes in the System.Reflection namespace, together with the System.Type class, are used to obtain information about loaded assemblies and the types defined within them, such as classes, interfaces, and value types. Reflection can be used to create type instances at run time, and to invoke and access them. In one approach, a library provides all of the target functions as .NET delegates. The library identifies each possible target function and associated arguments/parameters, and the processor at the calling computing platform reads the definitions using .NET reflection. A delegate is a form of type-safe function pointer used by the .NET Framework. Delegates specify a method to call and optionally an object to call the method on. Other implementations are possible as well.

The .NET Framework is a software framework developed by MICROSOFT® CORP. that runs primarily on Microsoft Windows®. It includes a large library and can operate across multiple programming languages. Programs written for the .NET Framework execute in a software environment known as the Common Language Runtime (CLR), an application virtual machine that provides services such as security, memory management, and exception handling. A set of class libraries and the CLR together constitute the .NET Framework. The .NET Framework is mentioned as an example only, as other implementations are possible.

Thus, in an example method, a calling computing platform comprises an unimplemented declaration of a target function, and the method determines a format in which a parameter is used by the target function using a reflection mechanism to discover class information of the unimplemented declaration of the first target function. Or, an object is provided which describes the target function, and an access of the object which describes the target function uses a reflection mechanism to discover class information of the object. The use of a reflection mechanism is an example only, as other implementations are possible.

An output of the object which describes the target function 207 is provided to a format conversion 208 which converts the one or more parameters to pass to the target function, if necessary, to the format which is specified for the target function. The format conversion 208 provides one or more converted parameters to pass to the target function 212 to the generic function call 210. Dummy parameters 209 can also be provided to the generic function call. Dummy parameters comprise dummy data which is not used by the target function. It is filler data meant to allow the generic function call to have a fixed number of parameters.

The generic function call 210 is prepared at the calling computing platform based on a number of inputs/parameters which may include a thread identifier parameter, a processor identifier parameter, a memory location reference parameter, one or more converted parameters to pass to the target function, and one or more dummy parameters. The generic function call is communicated via the communication interface 111 to the communication interface 121 at the target computing platform 120. The parameters of the generic function call can be stored in a buffer 126, external to the processor 122, for retrieval by the processor 122. When the processor is ready to execute a generic function which is called by the generic function call, it can retrieve the parameters and store them in registers such as the general-purpose registers 123 (e.g., for integer values) and/or the floating point registers 124 (e.g., for floating point values). Registers can be provided by word-sized locations in a central processing unit in which units of data are placed temporarily before they are operated on by program instructions. For example, the processor 122 may be a RISC processor which loads all of the parameters for a function into registers before the function is executed. In an example implementation, the target computing platform is provided according to the POWERPC™ (IBM® Corp.) architecture. POWERPC™, or Performance Optimization With Enhanced RISC—Performance Computing, is an example of a RISC architecture. Reduced instruction set computing (RISC) is a CPU design strategy which uses simplified instructions to provide higher performance.

The generic function call which is received from the calling computing platform is a call to a generic function which is defined by code on the target computing platform. The generic function 224 can be considered to be a superset of all target functions at the target computing platform. Based on the one or more parameters which identify the memory location reference, the processor 122 can identify the location of a specific one of the available target functions of the generic function 224 at the target computing platform, such as in a set of one or more libraries in the main memory 127. As an example, three example functions referred to as target function A 220, target function B 221 and target function C 222 are available. Assuming the generic function call contains a memory location reference to target function A, code of target function A is loaded into a runtime stack 125 where its instructions can be executed and where parameters can be passed to the target function as input value/arguments. Based on execution of the target function, one or more return values are generated which can be stored in the registers and provided to the application 200 at the calling computing platform 110 as the example return value 205. A return value can comprise a value or a reference to a value. A format of the return value can be modified at the format conversion 208 to provide the return value in a format which is compatible with the application 200 at the calling computing platform 110. The format is converted from the format in which the return value is received from the target computing platform.

A computing environment can include tangible computer readable storage having computer readable software embodied thereon for programming at least one processor to perform the methods described herein. The tangible computer readable storage can include, e.g., one or more of buffers 113 and 126 and main memory 114 and 127. Further, one or more processors of the computing environment can provide a processor-implemented method comprising processor-implemented steps as described herein. A processor can include, e.g., one or more of processors 112 and 122.

Figure 3:
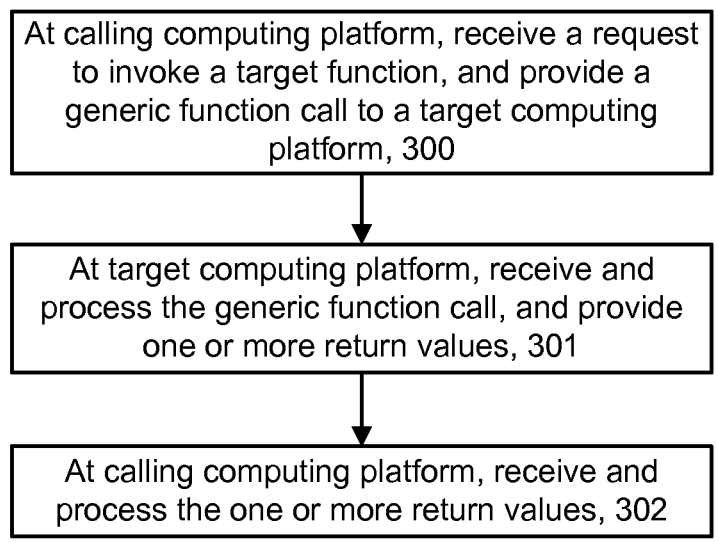
FIG. 3 is a flow chart describing one implementation of a process in which a calling computing platform calls a function on a target computing platform.

FIG. 3 is a flow chart describing one implementation of a process in which a calling computing platform calls a function on a target computing platform. The steps include: at the calling computing platform, receive a request to invoke a target function, and provide a generic function call to a target computing platform, 300; at target computing platform, receive and process the generic function call, and provide one or more return values, 301; and at calling computing platform, receive and process the one or more return values, 302. An overview of the process has been provided in connection with FIG. 2. Further details of steps 300 and 302 are provided, e.g., in connection with FIGS. 4-5D, and further details of step 301 are provided, e.g., in connection with FIGS. 6-7B.

Figure 4:
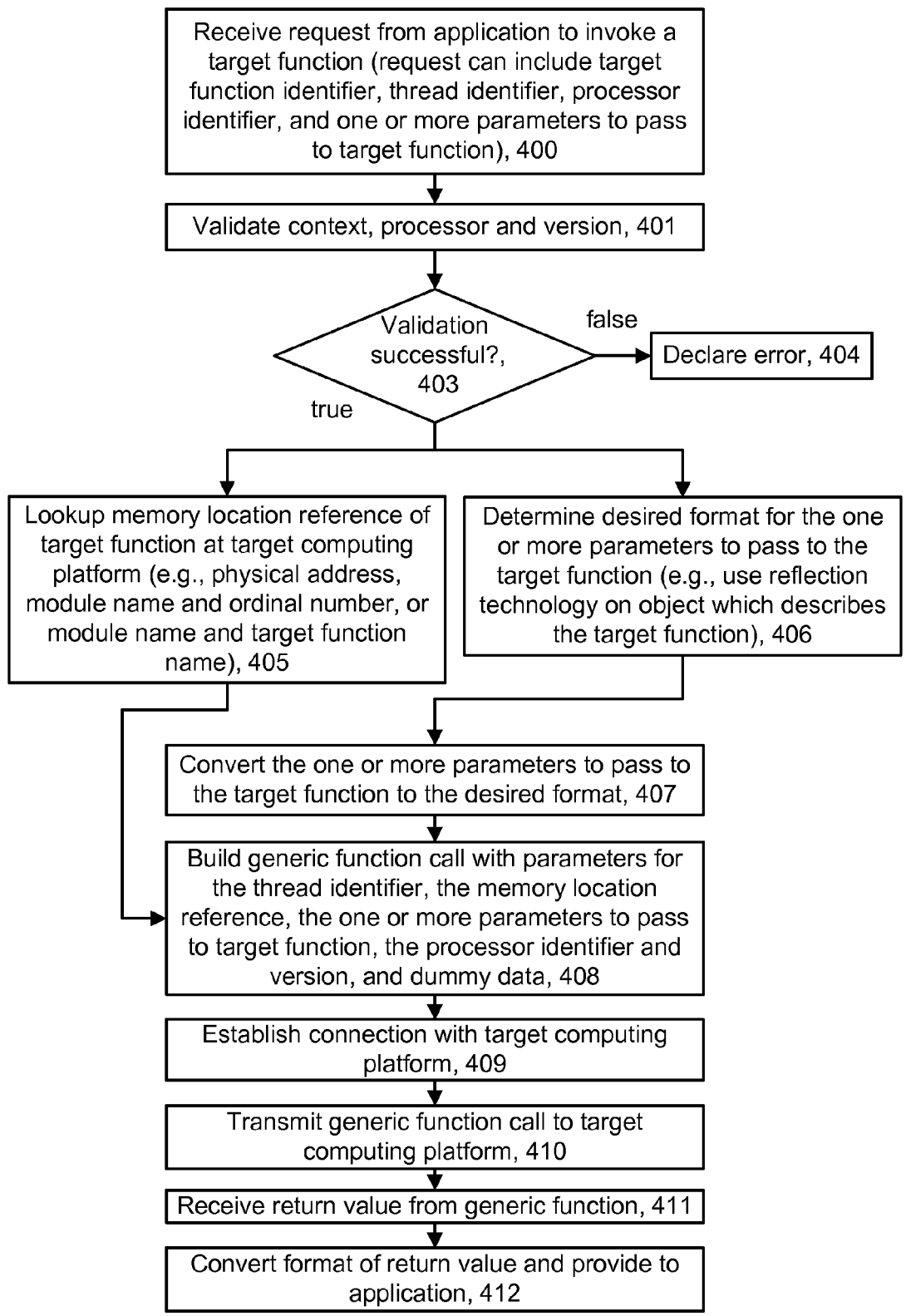
FIG. 4 is a flow chart of an example implementation of steps 300 and 302 of FIG. 3 in which a calling computing platform provides a generic function call to a target computing platform.

FIG. 4 is a flow chart of an example implementation of steps 300 and 302 of FIG. 3 in which a calling computing platform provides a generic function call to a target computing platform. The method can be used at a calling computing platform. The steps include: Receive request from application to invoke a target function (request can include target function identifier, thread identifier, processor identifier, and one or more parameters to pass to target function), 400; Validate context, processor and version, 401; Validation successful?, 403; Declare error, 404 (reached if decision step 403 is false); Lookup memory location reference of target function at target computing platform (e.g., physical address, module name and ordinal number, or module name and target function name), 405 (reached if decision step 403 is true); Determine desired format for the one or more parameters to pass to the target function (e.g., use reflection technology on object which describes the target function), 406 (reached if decision step 403 is true); Convert the one or more parameters to pass to the target function to the desired format, 407; Build generic function call with parameters for the thread identifier, the memory location reference, the one or more parameters to pass to target function, the processor identifier and version, and dummy data, 408; Establish connection with target computing platform, 409; Transmit generic function call to target computing platform, 410; Receive return value from generic function, 411; and Convert format of return value and provide to application, 412.

Regarding step 401, the context which is validated can involve a context of a requested thread on which to invoke the target function. For example, a target function of a particular application or game (title) thread may be associated with an application at the target computing device, in which case a request to run the target function on a system thread may be invalid. A request to run the target function on the title's thread would be valid. Step 401 can determine that a target function is appropriate for the thread and/or that the thread exists. Similarly, a requested processor on which to invoke the target function may be validated to confirm that it is present and operating, and it is otherwise appropriate for the target function. The version can be a version of software which is used at the calling computing platform, for instance, such as a version of a library which provides the objects which describe the available target functions, and/or software which is used at the target computing platform. The presence of an outdated or incompatible version of software, or an invalid context and/or processor, may result in an error being declared at step 404.

The lookup of the memory location reference at step 405 may be handled as discussed, e.g., in connection with the memory location reference lookup 206 in FIG. 2. The determination of the format at step 406 may be handled as discussed, e.g., in connection with the object which describes the target function 207 in FIG. 2. The conversion of the one or more parameters at step 407 may be handled as discussed, e.g., in connection with the format conversion 208 in FIG. 2. The building of the generic function call at step 409 may be handled as discussed, e.g., in connection with the generic function call 210 in FIG. 2. The establishing of a connection and the transmission of the generic function call at steps 409 and 410, respectively, can involve a wired and/or wireless path and any suitable communication protocol.

In step 407, the data for the parameters is converted from the format in which the parameters are received from the application at the calling computing platform to the format in which the parameters are to be provided to the target function. For example, data can be changed from 32 bit to 64 bit, from big endian to little endian, from character to integer, etc. This approach allows the calling computing platform to perform the work of providing the converted parameters in the desired format so that a conversion process at the resource-constrained target computing platform can be avoided.

Regarding step 407, the format in which a first parameter is used by a first target function can comprise one or more of a length, an integer or float type, an enumerated data type, a structured record type and an endianness. Other parameter types can be specified as well. For example, in the C++ language, types include: char, unsigned char, short, unsigned short, int, unsigned int, _int64, unsigned _int64, float, double, char*, WCHAR*, pointers, arrays and structs (structured records). Further, the format can indicate if the parameter is passed by value or by reference, and if an output by reference is expected. If a parameter is passed by value to the function, changes made to the parameter on the target computing platform are not returned to the calling computing platform.

When used with strings or arrays, this indicates the input string/array is sent as is. If a parameter is passed by reference to a function, the parameter is treated as both an input and output. This is used for functions on the target computing platform that are expecting a pointer value containing data that will then be edited or overwritten with new data. The parameter provided is sent across to the target computing platform and the data written to the buffer on the target computing platform is returned to the calling computing platform. A parameter passed as an output of a function may be used for functions that expect an empty buffer to fill with data. Any data provided to the function is ignored, and the data that the buffer is filled with on the target computing platform is brought back to the calling computing platform as a return value.

In step 409, the processor of the calling computing platform can build/create a generic function call, e.g., a call which is generic to multiple target functions on the target computing platform, such that any target function can be called by the generic function call. The generic function call includes the converted parameters in a specified form and structure which is used by a generic function. For example, if the generic function call has X parameters (e.g., 8 parameters) and the target function has fewer than X arguments, the generic function call can be padded with dummy data. The generic function call can also indicate a core, thread and a version number. In steps 409 and 410, the call to the generic function at the target computing platform is made. At step 411, a return value/result is received from the generic function. At step 412, the format of the return value is converted to a format which is used by the application at the calling computing platform. The same information which was used to determine the format to convert parameters for use by the target function can be stored by the calling computing platform and used for the subsequent back conversion to the application's format. The result of the generic function call is thus returned to the application.

An example method for use at a calling computing platform includes obtaining, from a request to invoke a first target function (e.g., target function A 220 in FIG. 2), an identifier of the first target function (e.g., target function identifier 201 in FIG. 2) and a first parameter (e.g., the one or more parameters to pass to the target function 204 in FIG. 2) to be passed to the first target function (e.g., step 400); based on the identifier of the first target function: determining one or more parameters which identify a memory location (e.g., one or more memory location reference parameters 211 in FIG. 2) of a target computing platform (e.g., target computing platform 120 in FIG. 2) at which the first target function is stored (e.g., step 405), and determining a format in which the first parameter is used by the first target function (e.g., step 406); converting a format of the first parameter from a format in which the first parameter is provided in the request for the first target function to the format in which the first parameter is used by the first target function, to provide a converted first parameter (e.g., one or more converted parameters to pass to target function 212 in FIG. 2; step 407); and providing a generic function call (e.g., generic function call 210 in FIG. 2) to the target computing platform, where the generic function call comprises the one or more parameters which identify the memory location and the converted first parameter (e.g., 212; step 408).

Such a method can be repeated for an additional, second target function. This method can include: obtaining, from a request to invoke a second target function (e.g., target function B 221 in FIG. 2), an identifier of the second target function and a second parameter to be passed to the second target function (e.g., step 400); based on the identifier of the second target function: determining one or more parameters which identify a memory location of the target computing platform at which the second target function is stored (e.g., step 405), and determining a format in which the second parameter is used by the second target function (e.g., step 406); converting a format of the second parameter from a format in which the second parameter is provided in the request for the second target function to the format in which the second parameter is used by the second target function, to provide a converted second parameter (e.g., step 407); and providing another instance of the generic function call to the target computing platform, the another instance of the generic function call comprises the one or more parameters which identify the memory location of the target computing platform at which the second target function is stored and the converted second parameter (e.g., step 408).

In one approach, the method includes providing the generic function call with a fixed number of parameters, independent of the target function, by providing the generic function call with at least one parameter of dummy data which is not used by the first target function (e.g., step 408).

Similarly, a calling computer platform/device (e.g., 110) can be provided which comprises: a storage device (e.g., 113, 114—see FIG. 1) comprising processor readable code; an interface (e.g., 111); and a processor (e.g., 112) in communication with the storage device and the interface. The processor executes the processor readable code to: receive a request for a target function from an application, the request comprising a parameter to be passed to the target function, access an object which describes the target function to determine a format of the parameter which is compatible with the target function, provide the parameter according to the format, determine a reference to a memory location of a target computing platform at which the target function is stored, construct a generic function call to the target computing platform, the generic function call comprises one or more parameters which identify the memory location, and the parameter which is provided according to the format, and communicate the generic function call to the target computing platform via the connection.

FIG. 5A depicts an example configuration 500 of parameters 501-508 in the generic function call 210 of FIG. 2, consistent with the process of FIG. 4, in which a thread identifier, a target function address, first and second parameters to pass to a target function, a processor identifier and dummy data are provided. The parameters are: Parameter1—Thread identifier, 501; Parameter2—Target function address, 502; Parameter3—Processor identifier, 503; Parameter4—First parameter to pass to target function, 504; Parameter5—Second parameter to pass to target function, 505; Parameter6—Dummy data, 506; Parameter7—Dummy data, 507; and Parameter8—Dummy data, 508. In this case, the generic function expects to receiver eight parameters in the sequence depicted. In one approach, the first parameter is the thread identifier, the next one or two parameters provide the reference memory location, the next parameter provides the processor identifier, when used, the next one or more parameters provide the one or more parameters to be passed to the target function, if any, and the remaining one or more parameters, if any, provide dummy data.

In one approach, each parameter has a specified length such as 32 or 64 bits which is consistent with a register in which the parameter is to be stored, and a corresponding integer or floating point type. Regarding the dummy data, this can be provided using a predetermined bit pattern. In one approach, the dummy data is transmitted to the target computing platform in a compact form which is shorter than the other parameters. The parameters essentially define how to call a function, where to call the function and what to call the function with.

As mentioned, the generic function call can be a call having a single format which allows calling of different target functions, one target function per call. The format can include a set number of parameters, e.g., eight, a specified order in which different kinds of parameters are transmitted (e.g., as shown in FIGS. 5A-5D), and a set length of each parameter, for instance.

FIG. 5B depicts another example configuration 510 of parameters 501-505 in the generic function call 210 of FIG. 2, consistent with the process of FIG. 4, in which a thread identifier, a target function address, a processor identifier, and first and second parameters to pass to a target function, but no dummy data, are provided. The parameters are: Parameter1—Thread identifier, 501; Parameter2—Target function address, 502; Parameter3—Processor identifier, 503; Parameter4—First parameter to pass to target function, 504; and Parameter5—Second parameter to pass to target function, 505. This configuration is similar to that of FIG. 5A but does not include the dummy parameters. In one approach, the dummy parameters are added by the target computing platform after determining that the total number of parameters is less than a fixed or pre-designated amount such as eight parameters.

FIG. 5C depicts another example configuration 520 of parameters 501, 521, 522, 503, 504 and 506-508, in the generic function call 210 of FIG. 2, consistent with the process of FIG. 4, in which a thread identifier, a module name, an ordinal number, a processor identifier, a first parameter to pass to a target function and dummy data are provided. The parameters are: Parameter1—Thread identifier, 501; Parameter2—Module name, 521; Parameter3—Ordinal number of target function in module, 522; Parameter4—Processor identifier, 503; Parameter5—First parameter to pass to target function, 505; Parameter6—Dummy data, 506; Parameter7—Dummy data, 507; and Parameter8—Dummy data, 508. This example shows the use of two parameters, Parameter2 and Parameter3, to identify the memory location reference.

FIG. 5D depicts another example configuration 530 of parameters 501, 521, 531, 503-505, 507 and 508 in the generic function call 210 of FIG. 2, consistent with the process of FIG. 4, in which a thread identifier, a module name, a target function name, a processor identifier, a first parameter to pass to a target function and dummy data are provided. The parameters are: Parameter1—Thread identifier, 501; Parameter2—Module name, 521; Parameter3—Name of target function in module, 531; Parameter4—Processor identifier, 503; Parameter5—First parameter to pass to target function 504; Parameter6—Second parameter to pass to target function 505; Parameter7—Dummy data, 507; and Parameter8—Dummy data, 508. This example also shows the use of two parameters, Parameter2 and Parameter3, to identify the memory location reference, in a different way than in FIG. 5C. Note that two dummy parameters are provided in this example. The number of dummy parameters can differ when different target functions are called.

Figure 6:
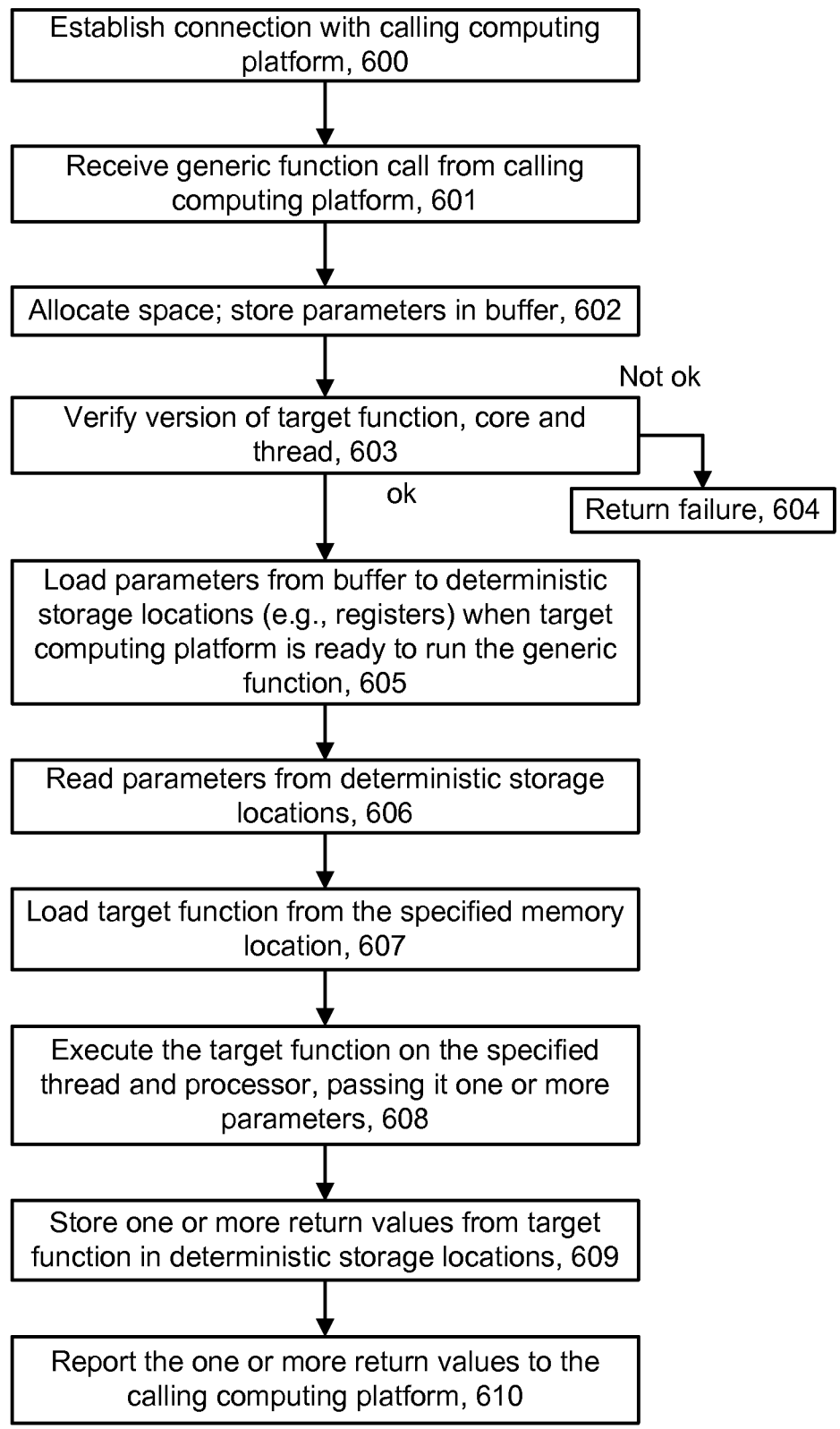
FIG. 6 is a flow chart of an example implementation of step 301 of FIG. 3 in which a target computing platform processes a generic function call.

FIG. 6 is a flow chart of an example implementation of step 301 of FIG. 3 in which a target computing platform processes a generic function call. The steps include: Establish connection with calling computing platform, 600; Receive generic function call from calling computing platform, 601; Allocate space; store parameters in buffer, 602; Verify version of target function, core and thread, 603; Return failure, 604 (reached if step 603 provided a not ok result); Load parameters from buffer to deterministic location (e.g., registers) when target computing platform is ready to run the generic function, 605 (reached if step 603 provided an ok result); Read parameters from deterministic location, 606; Load target function from the specified memory location, 607; Execute the target function on the specified thread and processor, passing it one or more parameters, 608; Store one or more return values from target function in deterministic location, 609; and Report the one or more return values to the calling computing platform, 610.

Referring to steps 600 and 601, as mentioned, a connection can be established, and the generic function call communication, using any available technique. Various transport processes such as error correction may be implemented to ensure the generic function call is properly received. Moreover, the generic function call can be received at an entry point of the target computing platform such as an application program interface (API).

In one approach, the API is part of a debug manager process at the target computing device. A native command can be added to the debug manager process which spawns a thread to receive data (e.g., parameters) of the generic function call, execute the target function, return results, and allocate space for arguments. The native command takes meta data for module name, function ordinal or name or address, process to execute on and system/title context. An eight-argument generic function pointer can be used to execute a target function.

The parameters of the generic function call can be retrieved and stored in a buffer or other memory location after space is allocated (step 602). For example, the processor can allocate memory for the argument/parameters for the target function. This can be done, e.g., before the parameters are obtained for the target function from the application at the calling computing platform. For example, the processor can read the definition of the target functions to determine what parameters are expected for the requested target function. The processor can request the data for the parameters from the application, the application can provide the data for the parameters with the request, or another data transfer mechanism can be used.

Generally, space can be allocated on the target computing platform which persists between calls from the calling computing platform. In one approach, an allocation function is called. A first type of an allocation function allows the target computing platform to specify the size in bytes to be allocated. A second type of an allocation function automatically determines the size of a provided parameter type and allocates space for it. This function works with value types (primitives and structs) but may not compile array types (strings and arrays).

If the version of the target function which is being called is verified successfully (step 603), e.g., the generic function determines that the version received in the function call matches the version of the generic function, the generic function can now be loaded. If the target function is not verified successfully, the function fails and a failure message is returned in step 604. The generic function can also verify that the requested core and thread exist and are appropriate.

Referring to step 605, once the processor is ready to execute the generic function, the generic function can be processed in a deterministic way by loading its parameters into deterministic storage locations such as respective registers. Although registers are mentioned as an example implementation, the deterministic storage locations can be any storage location. The loading of a pre-designated number of parameters at step 605 is responsive to determining that the thread and core/processor are appropriate to the target function at step 603. For example, the target computing system can access information which indicates whether a given target function, e.g., as identified by its memory reference location, is appropriate for a given thread and core/processor.

The parameters which are loaded into the deterministic storage locations include at least one parameter of dummy data which is not used by the target function. The target function executes without using the at least one parameter of dummy data.

Figure 7A:
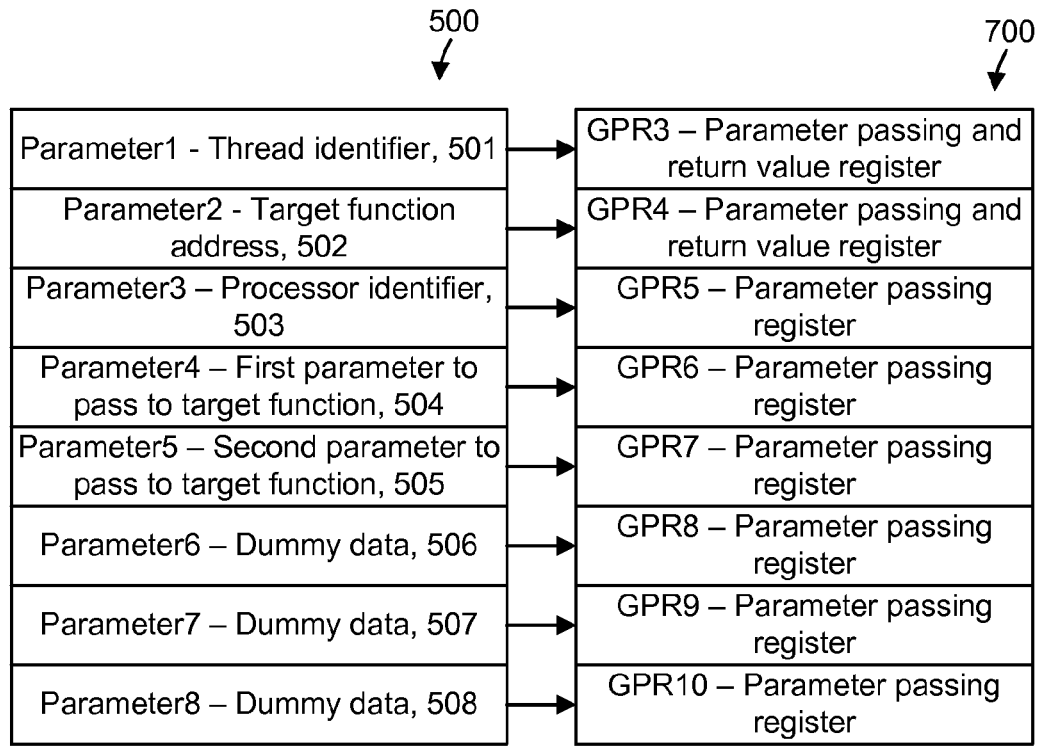
FIG. 7A depicts an example configuration of general purpose registers at a target computing platform in which parameters of the generic function call 500 of FIG. 5A are loaded.
Figure 7B:
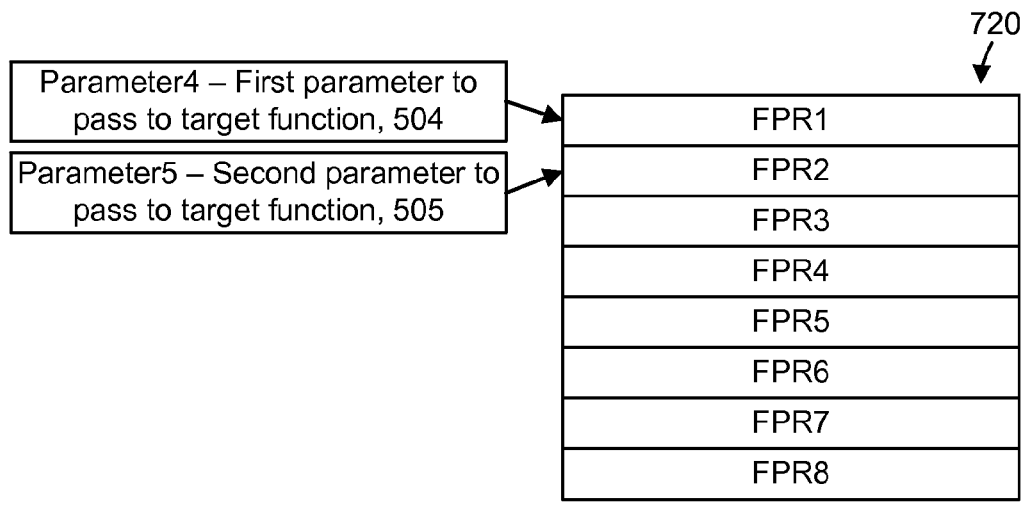
FIG. 7B depicts an example configuration of floating registers at a target computing platform in which parameters of a generic function call can be loaded.

See also FIGS. 7A and 7B. In one approach, each parameter is loaded into a respective register, one parameter per register, according to an order of the parameters in the generic function call. In one approach, the parameters are loaded into consecutive registers, e.g., registers having consecutive addresses such as GPR3-GPR10 in FIG. 7A.

Thus, in an example method, a pre-designated number of registers have consecutive addresses, each of the pre-designated number of registers is a parameter-passing register, and a pre-designated number of parameters are loaded in the pre-designated number of registers, one parameter per register.

Once the parameters are in the deterministic storage locations, they can be readily accessed by the processor at the target computing platform. Generally, the generic function stores the one or more parameters for the target function in an expected location on the target computing platform. For example, the parameters can be pushed on a stack or loaded in one or more pre-designated registers.

Regarding step 606, the generic function can read in the parameters which are stored in the deterministic storage locations such as registers in a consecutive order of the registers, in one approach. Assuming the configuration 500 of FIG. 5A, for instance, the generic function reads in the thread identifier to learn the thread to which the target function relates. The generic function then reads in the target function address and uses this to load the target function code, e.g., instructions, into other registers (step 607). The generic function thus calls and loads the target function in response to the generic function call. The generic function can read the target function, determine the format of the expected arguments/parameters and, optionally, convert the format of any of the arguments/parameters as appropriate.

The generic function can read in the first and second parameters to be passed to the target function, and the identifier of the processor on which the target function is to run. The instructions of the target function are executed, e.g., from a runtime stack, passing in the first and second parameters (step 608). The target function can access the parameters in the expected location and run by performing one or more tasks. The target function can also store one or more return values in one or more deterministic storage locations. These can be one or more of the same deterministic storage locations from which the parameters were loaded in, in one approach (step 609). For example, in the POWERPC™ register arrangement, discussed below in connection with FIGS. 7A and 7B, general purpose registers GPR3 and GPR4 are used designated to store return values. The return values can be reported to the calling computing platform from the specific register in which the return values were stored. Or, the target function can store the one or more return values in one or more deterministic storage locations which are different than the deterministic storage locations from which the parameters were loaded in.

A transaction identifier may be provided by the calling computing platform and included with the generic function call/request. The target computing platform can store the transaction identifier and include it with a response with the return values, to allow the calling computing platform to correlate the response with the request.

Generally, the target function can store one or more results in an expected location on the target computing platform, such as by pushing the results on a stack or loading them in one or more pre-designated registers. The generic function can then access the one or more results in the expected location and return the results to the calling computing platform. In this manner, multiple target functions can be called in the same way by the calling computing platform, thereby allowing the interface on the target computing platform to be more efficient and compact.

The actions of the generic function can be performed by the processor at the target computing device executing code of the generic function.

Note that the processor may run more than one thread and/or function at a time, such as in a time shared manner. In one approach, the processor can load in a first function, execute it, then stop its execution, loading in a second function and executing that, then loading in the first function again to resume execution, and so forth.

A method for use at a target computing platform comprises: automatically obtaining, from a generic function call of a calling computing platform (e.g., step 601), a pre-designated number of parameters, the pre-designated number of parameters comprise one or more parameters which identify a memory location of the target computing platform at which a first target function is stored and a first parameter to be passed to the first target function, the first parameter is in a format which is used by the first target function; loading the pre-designated number of parameters in a corresponding pre-designated number of deterministic storage locations (e.g., step 605); obtaining, from the pre-designated number of deterministic storage locations, the one or more parameters which identify the memory location (e.g., step 606); using the one or more parameters which identify the memory location to load the target function from the memory location (e.g., step 607); and obtaining the first parameter from the pre-designated number of deterministic storage locations and passing the first parameter to the first target function (e.g., step 608), the first target function executing using the first parameter and providing a return value; and storing the return value in one of the pre-designated number of registers (e.g., step 609).

The method can further include receiving multiple instance of the generic function call from the calling computing platform, and based on each instance of the generic function call, exercising a different target function of an application at the target computing platform.

Similarly, a target computer platform/device (e.g., 120) can be provided which comprises: a storage device (e.g., 126, 127—see FIG. 1) comprising processor readable code; an interface (e.g., 121); and a processor (e.g., 122) in communication with the storage device and the interface, where the processor executes the processor readable code to perform the functionality described herein.

FIG. 7A depicts an example configuration of general purpose registers at a target computing platform in which parameters of the generic function call 500 of FIG. 5A are loaded. In the example POWERPC™ architecture for the target computing device, several different types of registers are provided, including general purpose registers (GPRs) which hold integer values and floating point registers (FPRs) which hold floating point values. In a set of registers 700, the third and fourth GPRs (GPR3 and GPR4) are designated to store parameters to be passed in to a target function and return values from the target function, while the fifth through tenth GPRs (GPR5-GPR10) are designated to store parameters to be passed in to the target function. GPR3-GPR10 are parameter-passing registers which are able to each pass a parameter, e.g., to the generic function. Floating point registers FPRs include FPR1-FPR8. In this example, each parameter (Parameter1-Parameter8) of the generic function call 500 is stored in a respective register GPR3-GPR10, respectively. Each register can be 32 bits or 64 bits in size, for instance. In some cases, more than one parameter can be stored in one register.

FIG. 7B depicts an example configuration of floating registers at a target computing platform in which parameters of a generic function call can be loaded. The set of registers 720 includes FPR1-FPR8, as discussed. Generally, a generic function call can include simple type parameters such as integer and/or floating point parameters. A string can be represented by an unsigned integer which points to an address in memory in which the string is stored. Additional types could be used as well. In this example, Parameter4 and Parameter5 are floating point values which hare stored in FPR1 and FPR2, respectively. The floating point registers can also be considered to be parameter-passing registers and one or more may store a return value. In another example, Parameter4 is an integer value which is stored in a GPR and Parameter5 is a floating point value which is stored in FPR1. Thus, both integer and floating point value parameters can be provided in a generic function call.

Figure 8:
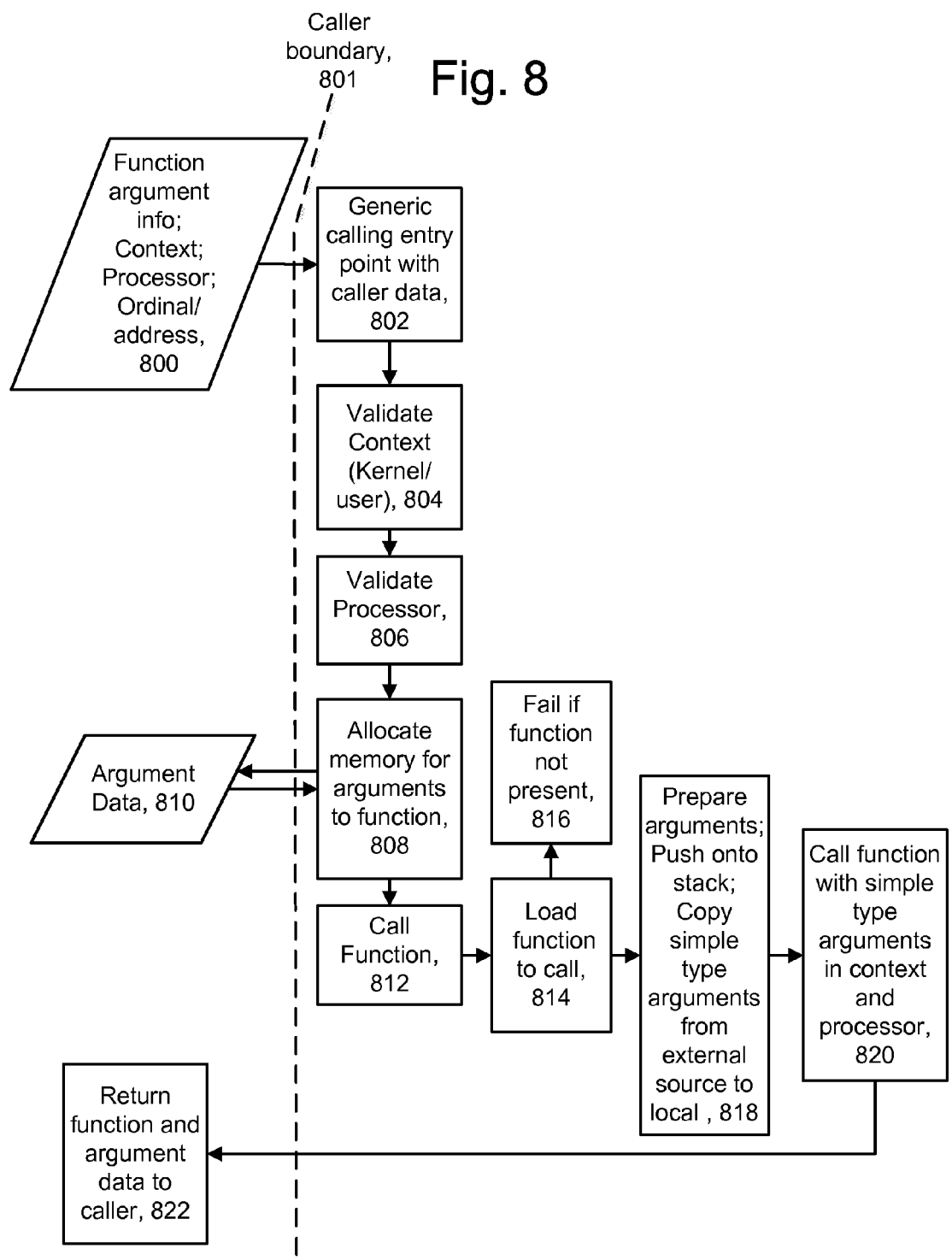
FIG. 8 is a flow chart depicting another example implementation of the process of FIG. 3 in which a calling computing platform provides a generic function call to a target computing platform.

FIG. 8 is a flow chart depicting another example implementation of the process of FIG. 3 in which a calling computing platform (caller) provides a generic function call to a target computing platform (callee). The caller boundary 801 is a boundary between actions by the calling computing platform on the left side and actions by the target computing platform on the right side. At input step 800, the target function argument information (e.g., parameters), context, processor and ordinal or address are provided across the boundary as caller data. At step 802, the caller data is received at an entry point of the target computing platform. At step 804, the context of the call is validated, e.g., in terms of a kernel/operating system and a user. At step 806, the processor is validated. Step 808 allocates memory for arguments/parameters which will be passed to the target function. This can involve input of argument/parameter data at step 810 and communication with the calling computing platform. The call of the function is initiated at step 802. Step 804 loads a function to call. A failure is declared at step 816 if the function is not present. If the function is present, step 818 is performed which includes preparing argument/parameters, pushing the argument/parameters onto the stack; and copying simple type arguments from an external source to local. Step 820 involves calling the function with simple type arguments in the specified context and with the specified processor. Step 822 involves returning from the function and passing the return argument data to the caller.

In one approach, all parameter types are represented as either an integer (int) (for example, character type is really a number) or floating point value (float). Precision values can be represented as two floats (double is a 64-bit float). A deterministic calling convention is used to allow for calling of any function through use of a function pointer and generic int and float arguments. In one approach, all arguments are passed to the target computing platform in each call regardless of whether a value is present or not. Alternatively, it is possible to support a system that does not pass in all arguments each time. Instead, the system passes arguments that are used without passing arguments that are not used by the target function. On the target computing platform, the return value is also stored in a deterministic register so that the value can be returned to the caller. For complex types, such as structures or classes, these objects are created in memory exactly as the target computing platform would create them. Since the calling convention is deterministic, the function operates on these structures as it would normally.

The calling computing platform can indicate which processor a target function should run on, and in what context (e.g., kernel/system mode/user mode) a target function should run. This technology provides the caller with the option to specify processor and context, giving the ability to execute the function as the same way the code within the system does. To know what function the caller would like to call, the system takes either the ordinal or memory address of the function. The function is then loaded by the system arguments are pushed into the deterministic locations that the function expects and then called. The results are returned from a deterministic location to the caller. Results can be returned by reference or by value.

Figure 9:
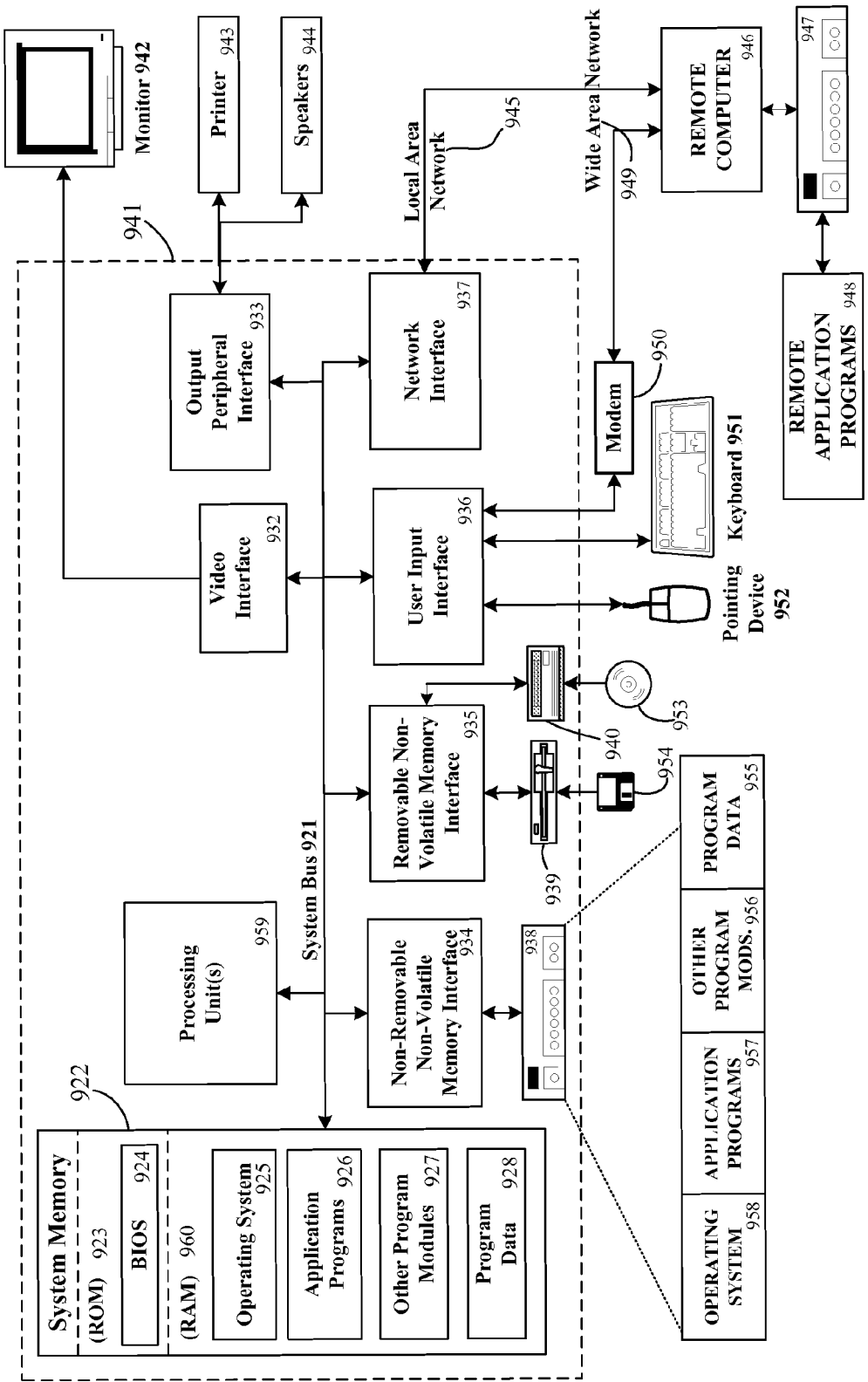
FIG. 9 is a block diagram of a computing system 920 as an example implementation of the calling computing platform 110 of FIG. 1.

FIG. 9 is a block diagram of a computing system 920 as an example implementation of the calling computing platform 110 of FIG. 1. The computing system 920 is one example of a suitable computing system and is not intended to suggest any limitation as to the scope of use or functionality of the presently disclosed subject matter. In some implementations the various depicted computing elements may include circuitry configured to instantiate specific aspects of the present disclosure. For example, the term circuitry used in the disclosure can include specialized hardware components configured to perform function(s) by firmware or switches. In other examples implementations the term circuitry can include a general purpose processing unit, memory, etc., configured by software instructions that embody logic operable to perform function(s). In example implementations where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 920 comprises a computer 941, which typically includes a variety of non-transitory computer readable media. Computer readable media can be any available media that can be accessed by computer 941 and includes both volatile and nonvolatile media, removable and non-removable media. The system memory 922 includes computer storage media in the form of volatile and/or nonvolatile memory such as read only memory (ROM) 923 and random access memory (RAM) 960. A basic input/output system 924 (BIOS), containing the basic routines that help to transfer information between elements within computer 941, such as during start-up, is typically stored in ROM 923. RAM 960 typically contains data and/or program modules that are immediately accessible to and/or presently being operated on by processing unit 959. By way of example, and not limitation, the figure illustrates operating system 925, application programs 926, other program modules 927, and program data 928.

The computer 941 may also include other removable/non-removable, volatile/nonvolatile computer storage media. By way of example only, the figure illustrates a hard disk drive 938 that reads from or writes to non-removable, nonvolatile magnetic media, a magnetic disk drive 939 that reads from or writes to a removable, nonvolatile magnetic disk 954, and an optical disk drive 940 that reads from or writes to a removable, nonvolatile optical disk 953 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 938 is typically connected to the system bus 921 through a non-removable memory interface such as interface 934, and magnetic disk drive 939 and optical disk drive 940 are typically connected to the system bus 921 by a removable memory interface, such as interface 935.

The drives and their associated computer storage media discussed above and illustrated in the figure provide storage of computer readable instructions, data structures, program modules and other data for the computer 941. For example, hard disk drive 938 is illustrated as storing operating system 958, application programs 957, other program modules 956, and program data 955. Note that these components can either be the same as or different from operating system 925, application programs 926, other program modules 927, and program data 928. Operating system 958, application programs 957, other program modules 956, and program data 955 are given different numbers here to illustrate that, at a minimum, they are different copies. A user may enter commands and information into the computer 941 through input devices such as a keyboard 951 and pointing device 952, commonly referred to as a mouse, trackball or touch pad. Other input devices (not shown) may include a microphone, joystick, game pad, satellite dish, scanner, or the like. These and other input devices are often connected to the processing unit 959 through a user input interface 936 that is coupled to the system bus, but may be connected by other interface and bus structures, such as a parallel port, game port or a universal serial bus (USB). A motion detection camera and capture device may define additional input devices that connect via user input interface 936. A monitor 942 or other type of display device is also connected to the system bus 921 via an interface, such as a video interface 932. In addition to the monitor, computers may also include other peripheral output devices such as speakers 944 and printer 943, which may be connected through a output peripheral interface 933.

The computer 941 may operate in a networked environment using logical connections to one or more remote computers, such as a remote computer 946. The remote computer 946 may be a personal computer, a server, a router, a network PC, a peer device or other common network node, and typically includes many or all of the elements described above relative to the computer 941, although only a memory storage device 947 has been illustrated. The logical connections depicted include a local area network (LAN) 945 and a wide area network (WAN) 949, but may also include other networks. Such networking environments are commonplace in offices, enterprise-wide computer networks, intranets and the Internet.

When used in a LAN networking environment, the computer 941 is connected to the LAN 945 through a network interface or adapter 937. When used in a WAN networking environment, the computer 941 typically includes a modem 950 or other means for establishing communications over the WAN 949, such as the Internet. The modem 950, which may be internal or external, may be connected to the system bus 921 via the user input interface 936, or other appropriate mechanism. In a networked environment, program modules depicted relative to the computer 941, or portions thereof, may be stored in the remote memory storage device. Application programs 948 may reside on memory device 947, for example. It will be appreciated that the network connections shown are exemplary and other means of establishing a communications link between computing platforms may be used.

Figure 10:
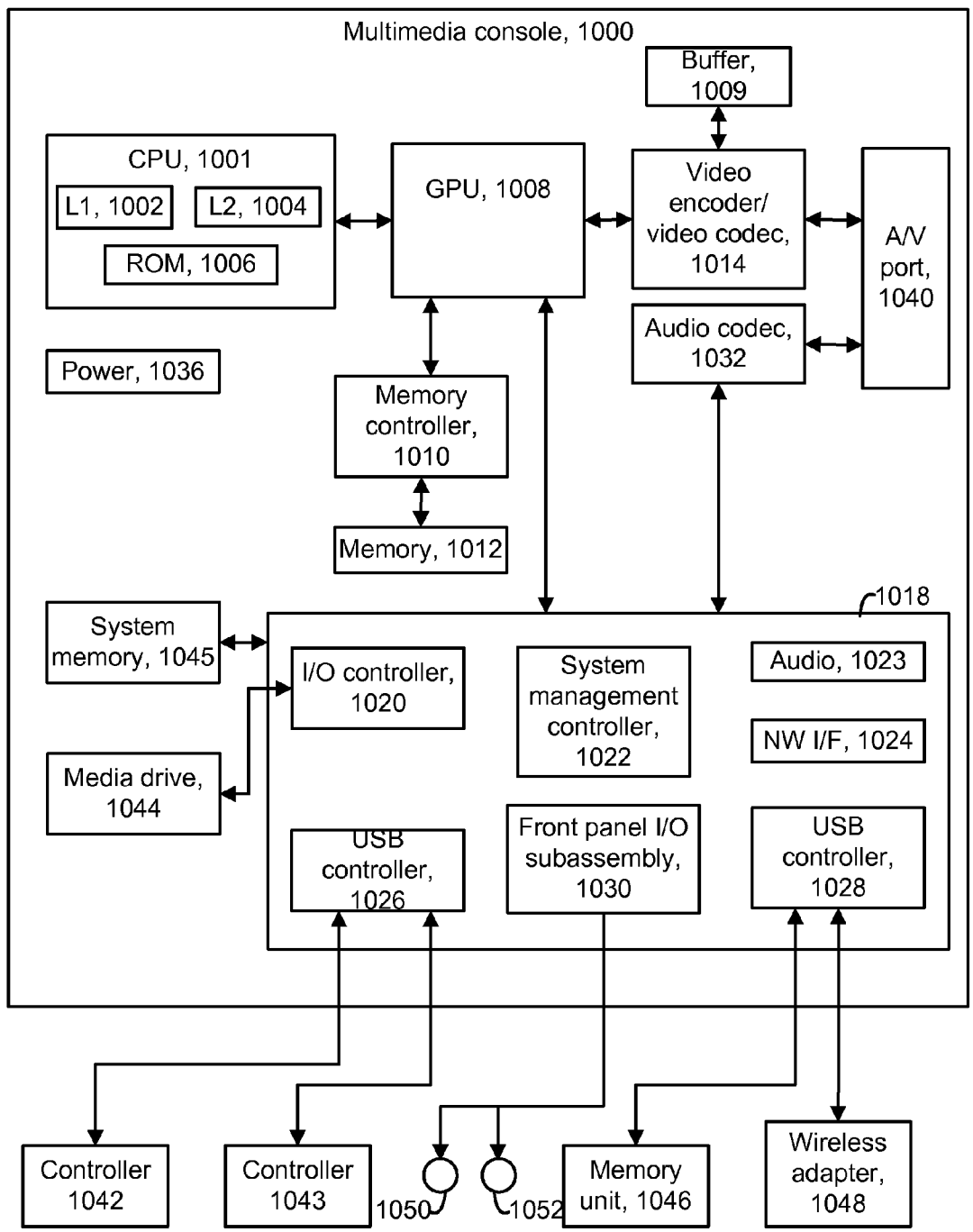
FIG. 10 is a block diagram of a multimedia/gaming console as an example implementation of the target computing platform 120 of FIG. 1.

FIG. 10 is a block diagram of a multimedia/gaming console as an example implementation of the target computing platform 112 of FIG. 1. The computing environment may include a multimedia console 1000, such as a gaming console with Internet connectivity. A central processing unit (CPU) 1001 has a level 1 (L1) cache 1002, a level 2 (L2) cache 1004, and a flash ROM (Read Only Memory) 1006. The L1 cache 1002 and L2 cache 1004 temporarily store data and hence reduce the number of memory access cycles, thereby improving processing speed and throughput. The CPU 1001 may have more than one core, and thus, additional level 1 and level 2 caches 1002 and 1004. The flash ROM 1006 may store executable code that is loaded during an initial phase of a boot process when the multimedia console 1000 is powered on.

A graphics processing unit (GPU) 1008 and a video encoder/video codec (coder/decoder) 1014 form a video processing pipeline for high speed and high resolution graphics processing. The coder/decoder 1014 may access a buffer 1009 for buffering frames of video. Data is carried from the GPU 1008 to the coder/decoder 1014 via a bus. The video processing pipeline outputs data to an A/V (audio/video) port 1040 for transmission to a television or other display. A memory controller 1010 is connected to the GPU 1008 to facilitate processor access to various types of memory 1012, such as RAM (Random Access Memory).

The multimedia console 1000 includes an I/O controller 1020, a system management controller 1022, an audio processing unit 1023, a network interface 1024, a first USB host controller 1026, a second USB controller 1028 and a front panel I/O subassembly 1030 that are preferably implemented on a module 1018. The USB controllers 1026 and 1028 serve as hosts for peripheral controllers 1042 and 1043, such as game controllers, a wireless adapter 1048, and an external memory unit 1046 (e.g., flash memory, external CD/DVD ROM drive, removable media, etc.) The network interface (NW IF) 1024 and/or wireless adapter 1048 provide access to a network (e.g., the Internet, home network, etc.) and may include wired or wireless adapter components including an Ethernet card, a modem, a Bluetooth module, a cable modem, and the like.

System memory 1045 is provided to store application data that is loaded during the boot process. A media drive 1044 may comprise a DVD/CD drive, hard drive, or other removable media drive. The media drive 1044 may be internal or external to the multimedia console 1000. Application data may be accessed via the media drive 1044 for execution, playback, etc. by the multimedia console 1000. The media drive 1044 is connected to the I/O controller 1020 via a bus, such as a Serial ATA bus or other high speed connection. The system management controller 1022 provides a variety of service functions related to assuring availability of the multimedia console 1000. The audio processing unit 1023 and an audio codec 1032 form an audio processing pipeline with high fidelity and stereo processing. Audio data is carried between the audio processing unit 1023 and the audio codec 1032 via a communication link. The audio processing pipeline outputs data to the A/V port 1040 for reproduction by an external audio player or device having audio capabilities.

The front panel I/O subassembly 1030 supports the functionality of the power button 1050 and the eject button 1052, as well as any LEDs (light emitting diodes) or other indicators exposed on the outer surface of the multimedia console 1000. A system power supply module 1036 provides power to the components of the multimedia console 1000.

The CPU 1001, GPU 1008, memory controller 1010, and various other components within the multimedia console 1000 are interconnected via one or more buses, including serial and parallel buses, a memory bus, a peripheral bus, and a processor or local bus using any of a variety of bus architectures.

When the multimedia console 1000 is powered on, application data may be loaded from the system memory 1045 into memory 1012 and/or caches 1002, 1004 and executed on the CPU 1001. The application may present a graphical user interface that provides a consistent user experience when navigating to different media types available on the multimedia console 1000. In operation, applications and/or other media contained within the media drive 1044 may be launched or played from the media drive 1044 to provide additional functionalities to the multimedia console 1000.

The multimedia console 1000 may be operated as a standalone system by simply connecting the system to a television or other display. In this standalone mode, the multimedia console 1000 allows one or more users to interact with the system, watch movies, or listen to music. However, with the integration of broadband connectivity made available through the network interface 1024 or the wireless adapter 1048, the multimedia console 1000 may further be operated as a participant in a larger network community.

When the multimedia console 1000 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

After the multimedia console 1000 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1001 at predetermined times and intervals to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager controls the gaming application audio level when system applications are active.

Input devices (e.g., controllers 1042 and 1043) are shared by gaming applications and system applications. The input devices are not reserved resources, but are to be switched between system applications and the gaming application such that each will have a focus of the device. The application manager preferably controls the switching of input stream, without the gaming application's knowledge and a driver maintains state information regarding switches.

The computing environment can include tangible computer readable storage having computer readable software embodied thereon for programming at least one processor to perform methods as described herein. The tangible computer readable storage can include, e.g., one or more of components 1002, 1004, 1006, 1012, 1045 and 1046. Further, one or more processors of the computing environment can provide a processor-implemented method comprising processor-implemented steps as described herein. A processor can include, e.g., one or more of CPU 1001 and memory controller 1010.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology described herein be defined by the claims appended hereto.

What is claimed is:

1. A method for use at a calling computing platform, comprising:
   obtaining, from a request to invoke a first target function, an identifier of the first target function and a first parameter to be passed to the first target function;
   based on the identifier of the first target function, automatically determining one or more parameters which identify a memory location of a target computing platform at which the first target function is stored and determining a format in which the first parameter is used by the first target function;
   automatically converting a format of the first parameter to the format in which the first parameter is used by the first target function, to provide a converted first parameter; and
   automatically creating and providing a generic function call to the target computing platform, the generic function call comprises the one or more parameters which identify the memory location and the converted first parameter.

2. The method of claim 1, wherein:
   the calling computing platform comprises an unimplemented declaration of the first target function; and
   the determining the format in which the first parameter is used by the first target function includes using a reflection mechanism to discover class information of the unimplemented declaration of the first target function.

3. The method of claim 1, further comprising:
   obtaining, from a request to invoke a second target function, an identifier of the second target function and a second parameter to be passed to the second target function;
   based on the identifier of the second target function, determining one or more parameters which identify a memory location of the target computing platform at which the second target function is stored and determining a format in which the second parameter is used by the second target function;

converting a format of the second parameter to the format in which the second parameter is used by the second target function, to provide a converted second parameter; and providing another instance of the generic function call to the target computing platform, the another instance of the generic function call comprises the one or more parameters which identify the memory location of the target computing platform at which the second target function is stored and the converted second parameter.

4. The method of claim 1, further comprising:
providing the generic function call with a fixed number of parameters, independent of the target function, by providing the generic function call with at least one parameter of dummy data which is not used by the first target function.

5. The method of claim 1, wherein:
the format in which the first parameter is used by the first target function comprises a length.

6. The method of claim 1, wherein:
the generic function call comprises a call having a single format which allows calling of different target functions, the single format has a fixed number of parameters and each of the fixed number of parameters has a fixed length.

7. The method of claim 1, wherein:
the one or more parameters which identify the memory location comprise a physical address at the target computing platform.

8. The method of claim 1, wherein:
the one or more parameters which identify the memory location comprise: (a) a parameter which comprises a name of a module comprising the first target function and a parameter which comprises an ordinal number of the first target function in the module, or (b) the parameter which comprises the name of the module comprising the first target function and a parameter which comprises a name of the first target function in the module.

9. The method of claim 1, further comprising:
providing the generic function call with a parameter which identifies a thread on which the first target function is to run at the target computing platform.

10. The method of claim 1, further comprising:
providing the generic function call with a parameter which identifies a processor among multiple processors at the target computing platform on which the first target function is to run.

11. A method for use at a target computing platform, comprising:
automatically obtaining, from a generic function call of a calling computing platform, a pre-designated number of parameters, the pre-designated number of parameters comprise one or more parameters which identify a memory location of the target computing platform at which a first target function is stored and a first parameter to be passed to the first target function, the first parameter is in a format which is used by the first target function;

loading the pre-designated number of parameters in deterministic storage locations;

obtaining, from the deterministic storage locations, the one or more parameters which identify the memory location;

using the one or more parameters which identify the memory location to load the target function from the memory location; and obtaining the first parameter from one of the deterministic storage locations and passing the first parameter to the first target function, the first target function executing using the first parameter and providing a return value.

12. The method of claim 11, wherein:
the pre-designated number of parameters comprise at least one parameter of dummy data;
the loading comprises loading the at least one parameter of dummy data in the deterministic storage locations; and
the first target function executes without using the at least one parameter of dummy data.

13. The method of claim 11, further comprising:
storing the return value in one of the deterministic storage locations.

14. The method of claim 11, further comprising:
receiving multiple instance of the generic function call from the calling computing platform; and
based on each instance of the generic function call, exercising a different target function of an application at the target computing platform.

15. The method of claim 11, wherein the pre-designated number of parameters comprise a parameter which identifies a thread on which the first target function is to run at the target computing platform, the method further comprising:
determining that the thread is appropriate for the first target function, the loading of the pre-designated number of parameters is responsive to the determining that the thread is appropriate for the first target function.

16. The method of claim 11, wherein the pre-designated number of parameters comprise a parameter which identifies a processor on which the first target function is to run at the target computing platform, the method further comprising:
determining that the processor is appropriate for the first target function, the loading of the pre-designated number of parameters is responsive to the determining that the processor is appropriate for the first target function.

17. The method of claim 11, wherein:
the one or more parameters which identify the memory location comprise a physical address at the target computing platform, a name of a module and an ordinal number of the first target function in the module, or the name of the module and a name of the first target function in the module.

18. A computing device, comprising:
a storage device comprising processor readable code;
an interface; and
a processor in communication with the storage device and the interface, the processor executes the processor readable code to receive a request for a target function from an application, the request comprising a parameter to be passed to the target function, the processor accesses an object which describes the target function to determine a format of the parameter which is compatible with the target function and provides the parameter according to the format, the processor determines a reference to a memory location of a target computing platform at which the target function is stored and constructs a generic function call to the target computing platform, the generic function call comprises one or more parameters which identify the memory location, and the parameter which is provided according to the format, and the processor communicates the generic function call to the target computing platform.

19. The computing device of claim 18, wherein:
the format of the parameter which is compatible with the target function comprises at least one of a length, a type or an endianness.

20. The computing device of claim 18, wherein:
the access of the object which describes the target function uses a reflection mechanism to discover class information of the object.

\* \* \* \* \*